(12) United States Patent
Marini et al.

(10) Patent No.: US 9,061,471 B2
(45) Date of Patent: Jun. 23, 2015

(54) KIT, WITH AN IMPROVE GAUGE, FOR REPAIRING AND INFLATING INFLATABLE ARTICLES, AND RELATIVE METHOD

(75) Inventors: Maurizio Marini, Pesaro (IT); Sergio Lolli, Pesaro (IT)

(73) Assignee: TEK GLOBAL S.R.L., Pesaro (IT)

( * ) Notice: Subject to any disclaimer, the term of this patent is extended or adjusted under 35 U.S.C. 154(b) by 942 days.

(21) Appl. No.: 12/999,798

(22) PCT Filed: Jun. 22, 2009

(86) PCT No.: PCT/IB2009/006009
§ 371 (c)(1),
(2), (4) Date: Apr. 14, 2011

(87) PCT Pub. No.: WO2009/156817
PCT Pub. Date: Dec. 30, 2009

(65) Prior Publication Data
US 2011/0180178 A1    Jul. 28, 2011

(30) Foreign Application Priority Data
Jun. 23, 2008   (IT) .............................. TO2008A0493

(51) Int. Cl.
*B65B 31/00* (2006.01)
*B29C 73/02* (2006.01)
*B29C 73/16* (2006.01)
*B29L 30/00* (2006.01)

(52) U.S. Cl.
CPC ........... *B29C 73/166* (2013.01); *B29L 2030/00* (2013.01)

(58) Field of Classification Search
USPC .................... 141/5, 9, 38, 351, 104; 81/15.6; 152/415
See application file for complete search history.

(56) References Cited

U.S. PATENT DOCUMENTS

| | | | |
|---|---|---|---|
| 6,705,360 B1 * | 3/2004 | Bonzer | 141/38 |
| 6,789,581 B2 * | 9/2004 | Cowan et al. | 141/38 |
| 7,789,110 B2 * | 9/2010 | Marini | 141/38 |
| 7,789,112 B1 * | 9/2010 | Wise | 141/95 |
| 8,146,622 B2 * | 4/2012 | Guan et al. | 141/38 |
| 2008/0145245 A1 | 6/2008 | Chou | |

* cited by examiner

*Primary Examiner* — Timothy L Maust
*Assistant Examiner* — Timothy P Kelly
(74) *Attorney, Agent, or Firm* — Ladas & Parry LLP

(57) ABSTRACT

A kit for repairing and inflating inflatable articles has a compressor assembly; a sealing fluid canister assembly connectable fluidically to the compressor assembly; a pressure sensor connected to the compressor assembly; a display device for displaying a pressure signal generated by the pressure sensor; and control means connected between the pressure sensor and the display device, and designed to cut off the signal to the display device for a predetermined time interval.

11 Claims, 3 Drawing Sheets

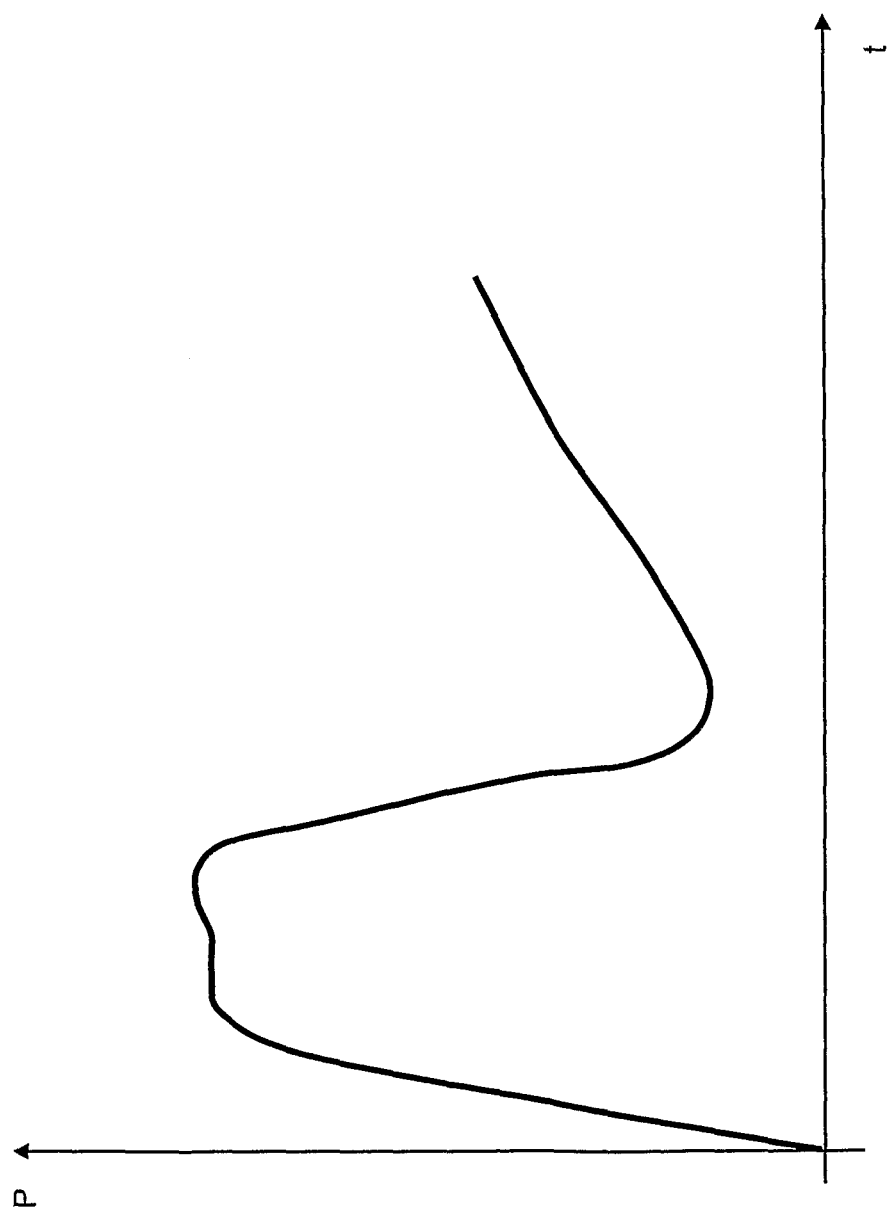

KIT, WITH AN IMPROVE GAUGE, FOR REPAIRING AND INFLATING INFLATABLE ARTICLES, AND RELATIVE METHOD

TECHNICAL FIELD

The present invention relates to a kit, with an improved gauge, for repairing and inflating inflatable articles.

A recent market trend is to replace the spare wheel of a vehicle with a kit for repairing and inflating a flat tyre without having to remove the tyre from the hub.

The kit normally comprises a compressor connectable to a power outlet; and a canister of sealing fluid connectable in series between the compressor and the flat tyre.

In the event of a flat tyre, the compressor injects the sealing fluid and then inflates the tyre.

BACKGROUND ART

The compressor is equipped with a gauge for controlling the pressure of the repaired tyre.

When repairing the tyre, the pressure reading on the gauge fluctuates and shows high peaks, which has been found to give the user the impression that the kit is nor working properly and that the tyre cannot be repaired.

DISCLOSURE OF INVENTION

It is an object of the present invention to provide a kit designed to eliminate the above drawback.

According to the present invention, there are provided a kit as claimed in claim 1, and a method as claimed in claim 8.

BRIEF DESCRIPTION OF THE DRAWINGS

A preferred, non-limiting embodiment of the present invention will be described by way of example with reference to the accompanying drawings, in which:

FIG. 3 shows a quality graph of pressure as a function of compressor operating time.

BEST MODE FOR CARRYING OUT THE INVENTION

Figure 1:
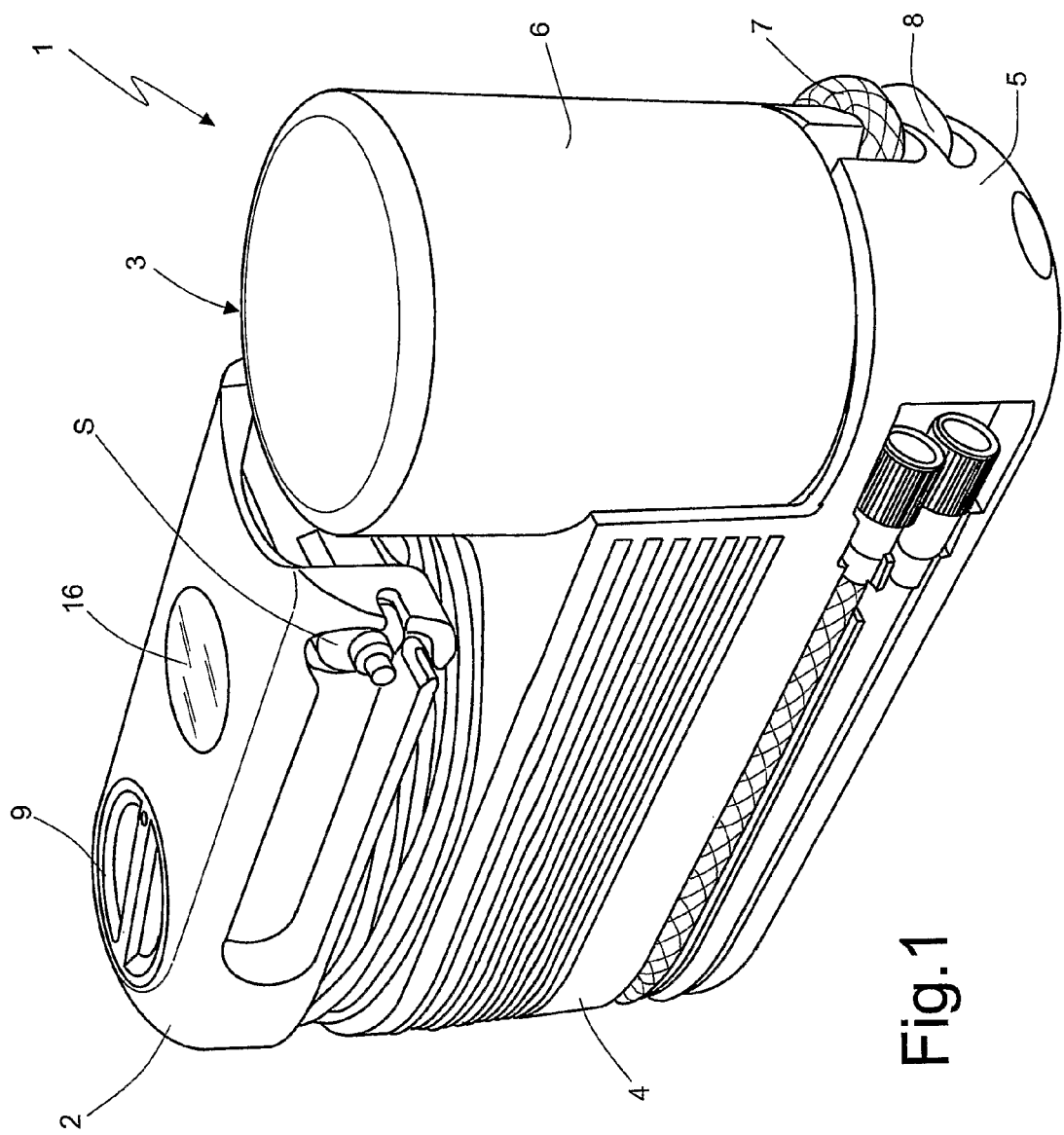
FIG. 1 shows a view in perspective of a kit in accordance with the present invention.

Number 1 in FIG. 1 indicates as a whole a kit for repairing and inflating inflatable articles, and which comprises a casing 2; a compressor assembly C (shown schematically in FIG. 2) housed in casing 2; and a canister assembly 3 connected releasably to compressor assembly C.

More specifically, casing 2 comprises a substantially parallelepiped-shaped portion 4 for housing compressor assembly C; and a projecting portion 5 projecting from the front of portion 4 to define a seat for at least partly housing canister assembly 3.

Canister assembly 3 contains tyre puncture repair sealing fluid, and comprises a bottle 6 turned upside down in use; and a hose 7 connected to bottle 6 to feed the sealing fluid into the tyre.

Kit 1 also comprises a second hose 8 connected directly to compressor assembly C to inflate the tyre without injecting sealing fluid. Kit 1 also comprises a knob 9 for selecting a repair mode, in which hose 7 and bottle 6 are connected to compressor assembly C; a pressure regulating and inflation mode, in which hose 8 is connected to compressor assembly C; and a compressor assembly C OFF mode.

Figure 2:
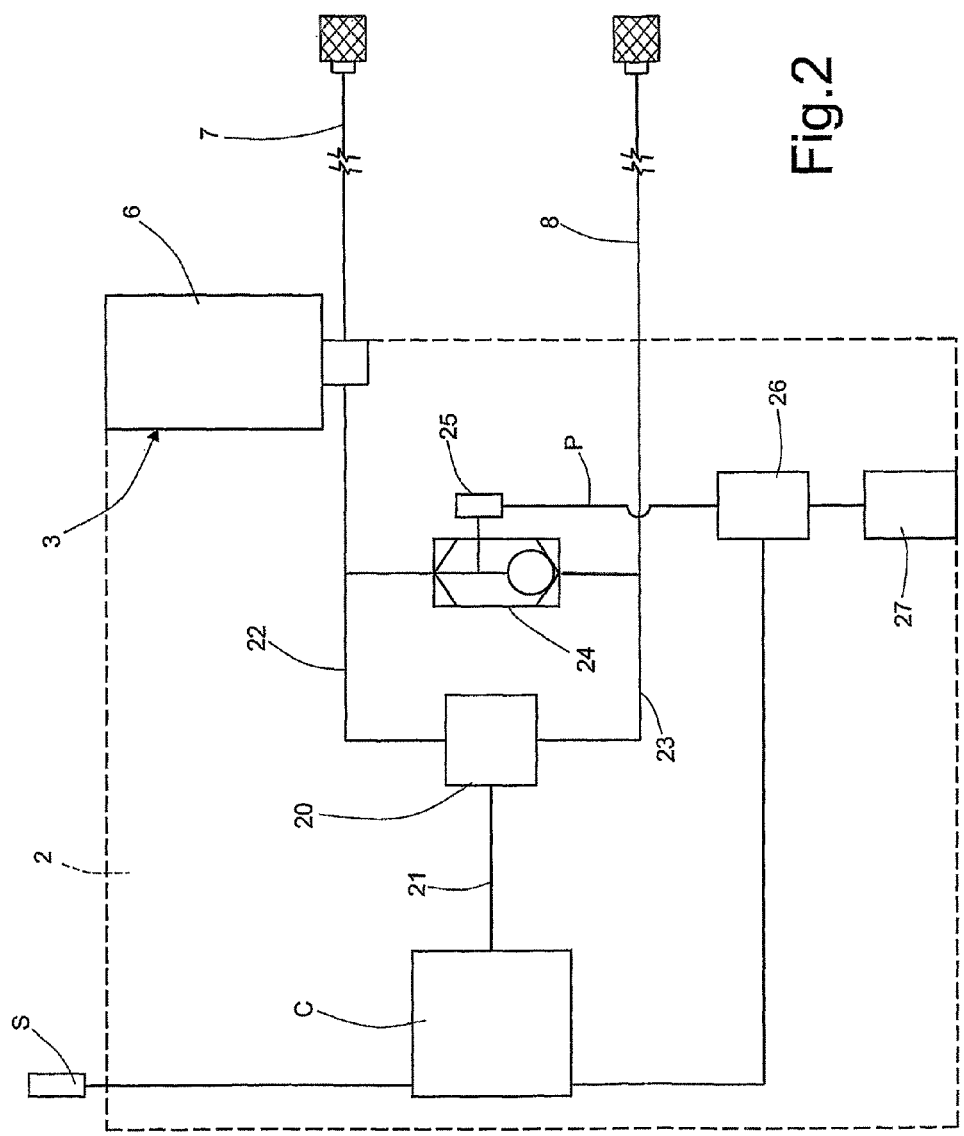
FIG. 2 shows a circuit diagram of the FIG. 1 kit.

FIG. 2 shows a diagram of the fluid circuit inside casing 2 of kit 1. The delivery side of compressor assembly C is connected to a one-inlet, two-outlet valve 20 by a conduit 21 inside casing 2.

Valve 20 is switched by knob 9, and provides for directing compressed airflow to bottle 6 to repair the tyre, or to hose 8 to inflate an inflatable article.

More specifically, one outlet of valve 20 is connected to an inlet of bottle 6 by a conduit 22 inside casing 2, and the other outlet is connected to hose 8 by a conduit 23 also inside casing 2. Conduits 22, 23 are therefore connected parallel with respect to valve 20.

Kit 1 also comprises an 'OR' fluidic member 24 having two inlets connected to conduits 22, 23 respectively, and an outlet connected to a pressure sensor 25.

Pressure sensor 25 is therefore always connected to the higher-pressure conduit 22, 23.

Pressure sensor 25 sends a signal P to a control device 26 inside casing 2.

In a preferred embodiment, signal P is electric, and control device 26 is electric or electronic, and is powered by a plug S which also powers compressor assembly C.

Kit 1 also comprises an LCD screen 27 connected to control device 26 to display the pressure measured by sensor 25 and so enable optimum user operation of compressor assembly C.

In a preferred embodiment of the present invention, control device 26 is designed so that pressure signal P is only displayed on screen 27 when compressor assembly C is activated in repair mode, i.e. in which compressor assembly C is connected to canister assembly 3.

Control device 26 preferably features a counter, which is activated when the compressor assembly is turned on by the user, and so serves as a timer. Control device 26 is programmed not to display the pressure measured by sensor 25 until the counter reaches a given threshold value. In other words, control device 26 cuts off display of pressure signal P until the counter reaches the threshold value.

The threshold value is programmed when manufacturing the kit, and represents the time interval in which the pressure signal stabilizes. Given the airflow of compressor assembly C and the volume of bottle 6, this time interval can be calculated easily.

Control device 26 is also designed to determine the setting of fluidic member 24, so that, when hose 8 is connected to the inflatable article, the counter is disabled, and the pressure signal is transmitted to screen 27 even if compressor assembly C has not yet been turned on. In this way, the user can check the pressure of the inflatable article without turning on compressor assembly C.

The signal from pressure sensor 25 has been found to indicate the actual tyre pressure substantially when bottle 6 is nearly or completely empty.

FIG. 3 shows a quality graph of the pressure measured by pressure sensor 25. The first peak indicates a pressure value not corresponding to the actual tyre pressure. The threshold value, after which to display the pressure measurement by pressure sensor 25 on screen 27, is preferably set about the minimum point substantially corresponding to when bottle 6 is empty.

The advantages of the present invention will be clear from the above description of kit 1.

In particular, delaying display of the pressure value on screen 27 provides for displaying a more stable pressure value than would be shown as soon as compressor assembly C is turned on with kit 1 operating in repair mode.

By means of fluidic member 24, a single pressure sensor 25 can be employed.

Using a timer implemented in control device 26 is easy to achieve and reduces manufacturing cost.

Clearly, changes may be made to the kit as described and illustrated herein without, however, departing from the scope of the present invention.

In particular, the control device may be mechanical, and the screen analogical.

Control device 26 may also be programmed so that pressure signal P is first displayed, then not displayed temporarily, and eventually displayed again. In this case too, control device 26 cuts off display of the pressure signal on screen 27.

The invention claimed is:

1. A kit for repairing and inflating inflatable articles, comprising a compressor assembly; a sealing fluid canister assembly connectable fluidically to said compressor assembly; a pressure sensor connected to the delivery side of said compressor assembly; and a display device for displaying a pressure signal generated by said pressure sensor; control means connected between said pressure sensor and said display device, and designed to cut off said signal to said display device for a predetermined time interval.

2. A kit as claimed in claim 1, wherein said time interval comprises the instant said compressor assembly is activated.

3. A kit as claimed in claim 1, wherein said control device comprises a timer.

4. A kit as claimed in claim 1, comprising a hose connected, parallel with said canister assembly, to said compressor assembly (C); and a fluidic device having two inlets connected to said canister assembly and said hose respectively, and an outlet connected to said pressure sensor, said fluidic device being configured such that either of the inlets may be operably linked to the pressure sensor.

5. A kit as claimed in claim 4, characterized in that said control device (26) is designed to determine the setting of said fluidic device (24).

6. A kit as claimed in claim 1, wherein said control device is designed to only transmit said signal when said canister assembly is empty.

7. A kit as claimed in claim 1, wherein said display device is a screen, and said control device is electric or electronic.

8. A method comprising providing
   a compressor assembly;
   a sealing fluid canister assembly connectable fluidically to said compressor assembly;
   a pressure sensor connected to the delivery side of said compressor assembly;
   and a display device for displaying a pressure signal generated by said pressure sensor; and
   control means connected between said pressure sensor and said display device, and designed to cut off said signal to said display device for a predetermined time interval and
   cutting off said display so as not display said pressure signal for a predetermined period; and displaying, following said cut-off step, in which the value of said pressure signal on said display device.

9. A method as claimed in claim 8, wherein said time interval comprises the instant said compressor assembly is activated.

10. A method as claimed in claim 8 wherein said cutting off of said display of the pressure signal occurs when the compressor is activated.

11. A kit for repairing and inflating inflatable articles, comprising a compressor assembly (C); a sealing fluid canister assembly (3) connectable fluidically to said compressor assembly (C); a pressure sensor (25) connected to both the delivery side of said compressor assembly (C); and a display device (27) for displaying a pressure signal (P) generated by said pressure sensor (25); the kit comprising control means (26) connected between said pressure sensor (25) and said display device (27), said control means being programmed to cut off said signal (P) to said display device (27) for a predetermined time interval when said compressor is activated and to permit passage of any such signal generated by the pressure sensor if the compressor is turned off.

* * * * *